March 29, 1966

C. C. MATLE ETAL 3,242,717

HYDROGEN SENSOR

Filed March 26, 1963

INVENTORS
CALVIN C. MATLE
PAUL A. MICHAELS
BY WILLIAM G. WOLBER
RONALD ZIELONKA

ATTORNEY

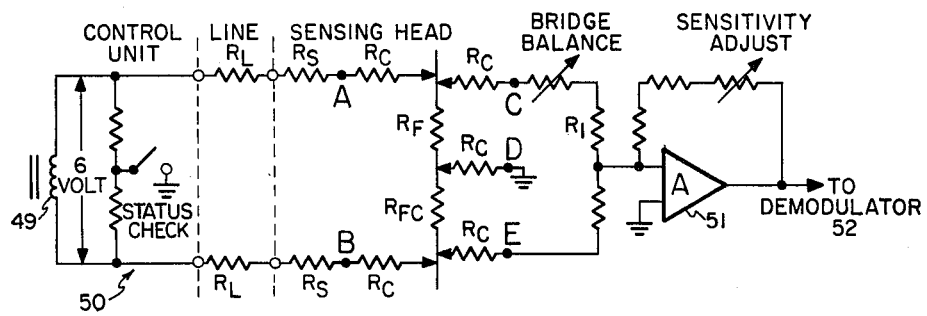

$R_L$, LINE RESISTANCE $\leq$ 10 Ω
 (LESS THAN 1000 FT. OF AWG NO. 20 WIRE)
$R_C$, FILM CONTACT RESISTANCE $\leq$ 10 Ω
$R_S$, LINE PADDING RESISTOR $\approx$ 1K Ω
$R_1, R_2$, AMPLIFIER INPUT RESISTORS $\approx$ 1K Ω
$R_F, R_{FC}$, PALLADIUM FILMS

Fig. 4

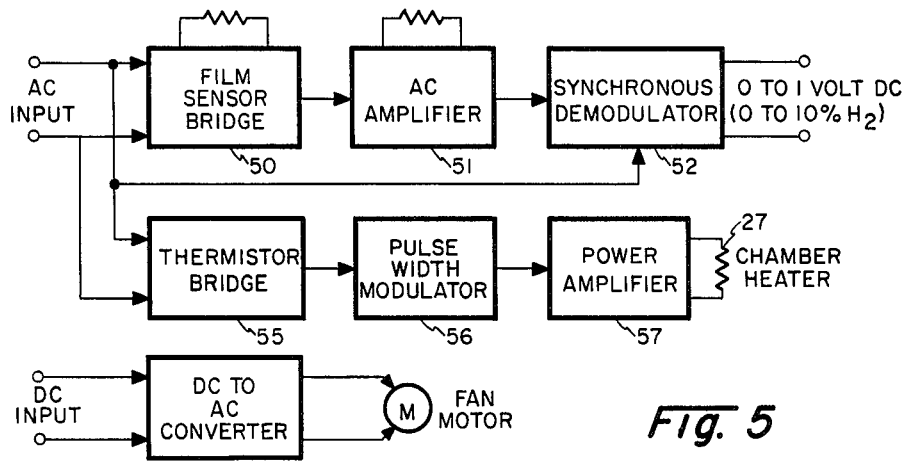

Fig. 5

SYSTEM PARAMETERS
DC INPUT VOLTAGE _____ 3 TO 12 VOLTS
DC POWER INPUT @ 6 VDC ___ 2 WATTS
AC INPUT VOLTAGE _____ 6 VOLTS PEAK
AC POWER INPUT _____ 100 MILLIWATTS
FILM TEMPERATURE _____ 75° C
FILM POWER DISSIPATION ___ 100 MICROWATTS

INVENTORS
CALVIN C. MATLE
PAUL A. MICHAELS
BY WILLIAM G. WOLBER
RONALD ZIELONKA

ATTORNEY

March 29, 1966  C. C. MATLE ETAL  3,242,717
HYDROGEN SENSOR
Filed March 26, 1963  4 Sheets-Sheet 4
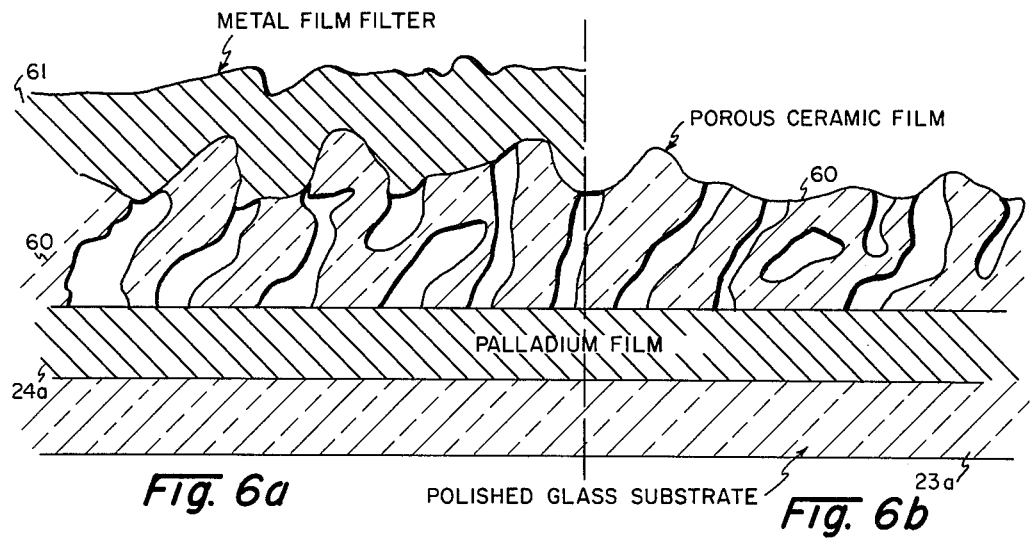
Fig. 6a  
Fig. 6b
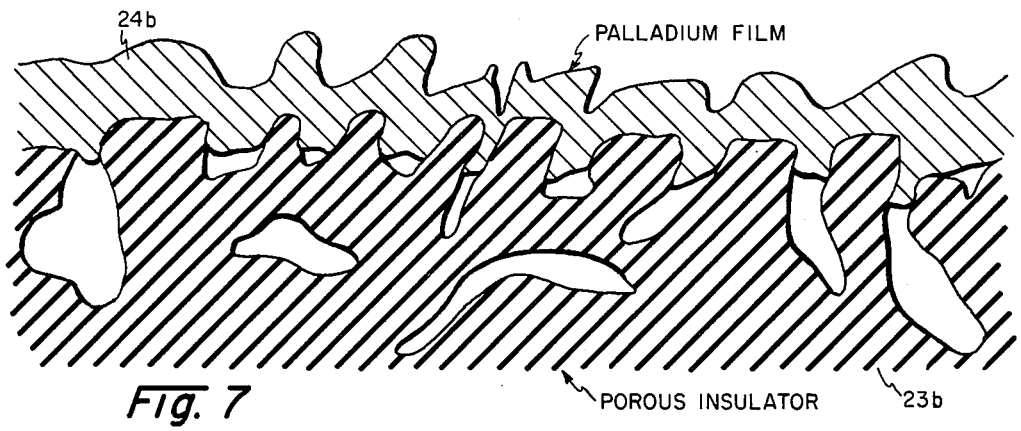
Fig. 7
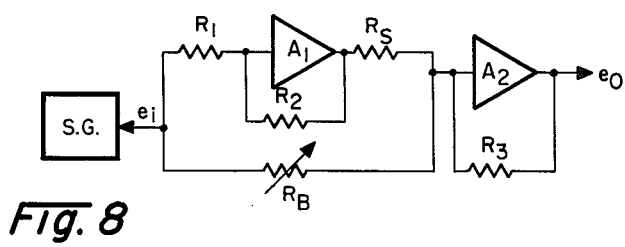
Fig. 8
*INVENTORS*
CALVIN C. MATLE
PAUL A. MICHAELS
WILLIAM G. WOLBER
RONALD ZIELONKA
BY
*Richard J. Seeger*
ATTORNEY United States Patent Office 3,242,717
Patented Mar. 29, 1966

3,242,717
HYDROGEN SENSOR
Calvin C. Matle, Detroit, Paul A. Michaels, Livonia, William G. Wolber, Detroit, and Ronald Zielonka, Royal Oak, Mich., assignors to The Bendix Corporation, Southfield, Mich., a corporation of Delaware
Filed Mar. 26, 1963, Ser. No. 268,190
2 Claims. (Cl. 73—27)

This invention pertains to a hydrogen sensor and more particularly to a sensor having high sensitivity, fast response time, temperature independence, and being explosion safe.

An essential object of this invention is to provide a hydrogen sensor utilizing a palladium, or other suitable metal sensing film, which changes in electrical conductivity upon exposure to hydrogen in an amount corresponding to the concentration of the hydrogen.

It is a further object to utilize such a sensing film having a high surface to volume ratio thereby greatly improving the speed of response.

Another object is to utilize an instrument having a tubular probe wherein the tubular probe has a bypass passage adjacent to the sensing film so that a high volume of air passes quickly through the probe but only a small volume is passed over the sensing film thereby improving response speed while utilizing a minimum of power to heat and pump the gas passing over the sensing film.

It is a further object to heat the incoming gas to a predetermined high temperature in order to realize the desired reaction between the sensing film and the hydrogen in the sampled gas.

A further object is to provide a second film which is subject to the same temperature as the first film but is masked to the hydrogen flow; and circuitry connected to the first and second films such as to eliminate any effect of temperature variations of the sensing film.

Another object is to maintain the temperature in the sensing chamber so that the hydrogen palladium alloy formed during sampling is always in its alpha phase for all hydrogen concentrations that are to be encountered in use.

Another object is to provide a circuit having no arcing contacts or switches in the area of the hydrogen gas, thereby eliminating the possibility of arcing and minimizing the possibility of an explosion in the sensor.

A further object of this invention is to use a porous film substrate on which the palladium film is deposited to speed film response due to the increased film area and due to the fact that the strains set up in the film surface increase film activity.

Another object is to provide for a porous ceramic film which is deposited over the palladium film which permits the hydrogen to reach the film through the pores but which prevents inert gases, or other gases having large molecules which will not be passed by the pores. This lowers the oxygen threshold and prevents inert gas poisoning.

A further object is to provide a second palladium film over the ceramic film of the previous object which further aids in filtering out gases other than hydrogen.

Another object is to use alternating current through the palladium film thereby improving stability since direct current causes ionic conductivity in the hydrogen palladium alloy.

A still further object is the use of a vapor deposited film approximately 500 to 5,000 angstroms thick which thickness is sufficient so that the resistance across the film is due primarily to the bulk of the film rather than to the surface of the film thereby improving the film resistance stability.

These and other objects will become more evident when preferred embodiments of this invention are considered in connection with the drawings in which:

FIGURE 4 is a schematic wiring diagram of the film sensor bridge circuit shown in the diagram of FIGURE 5;

FIGURE 5 is a box diagram of the electrical circuits utilized to measure and control the outputs and functions of the embodiment of FIGURE 1;

FIGURE 6a is a greatly enlarged sectioned view of a film having both a porous filter and a metal film filter;

FIGURE 6b is a greatly enlarged cross sectional view showing a film having only the porous ceramic film filter;

FIGURE 7 is a greatly enlarged sectioned view of a sensing film distributed on a porous insulator; and FIGURE 8 is an alternate circuit for film sensor bridge circuit in FIGURE 5.

Figure 1:
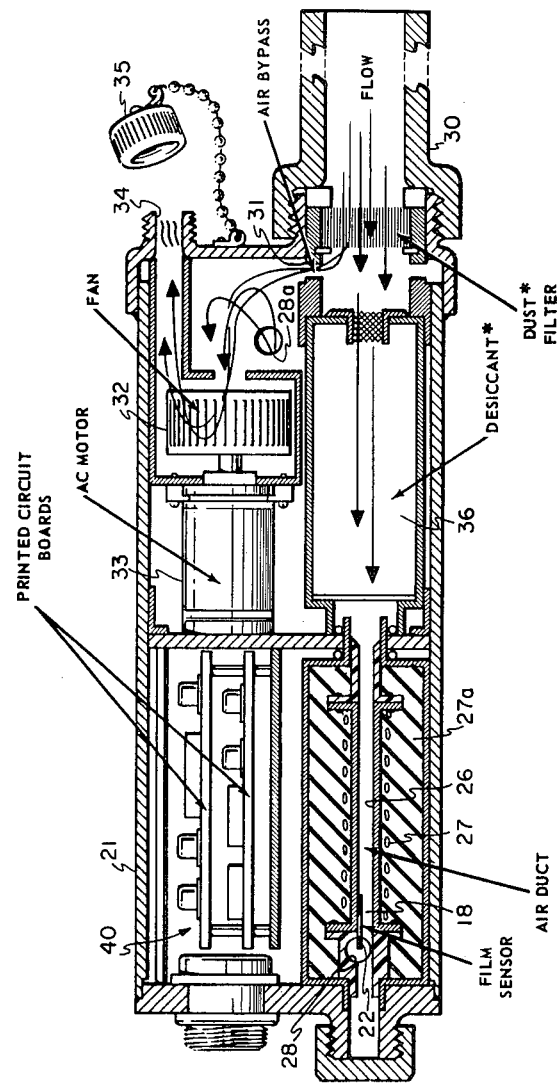
FIGURE 1 is a sectioned schematic view of a preferred embodiment of this invention.

A cross section of the unit having a sensor chamber 18 used in the preferred embodiment is shown in FIGURE 1. The housing 21 is made entirely of silver and is gold plated on the interior surface which is exposed to the sample air. A stainless steel plate 22 holds the element 23 on which a film 24 of palladium is deposited.

The film is preferably approximately 1,000 angstrom units thick and is operated at a temperature of 85° centigrade thereby providing very fast response time and permitting only the alpha phase hydrogen palladium alloy to exist.

The plate 22 is located at the end of duct 26 formed in the chamber about which are wound heating coils 27 which maintain the temperature of the duct at a predetermined level thereby bringing the temperature of the gas passing through the duct to a predetermined level. At the output end of plate 22 is a port 28.

The air to be analyzed enters probe 30 which has at the inner end thereof an air bypass passage 31 through which the greatest portion of the incoming gas is drawn by a fan 32 which is driven by an alternating current motor 33. The advantage of using an alternating current motor is to eliminate sparking or arcing and thereby minimize any explosion danger.

A desiccant 36 is placed in the path of the incoming air to dry and filter the air sample.

The output gas exits through exhaust 34 which when not in use may be covered by exhaust cap 35. The air from port 28 is drawn through a passage (not shown) and exits through port 28a and is blown out the exhaust 34 by the fan 32.

The bypass 31 has two major advantages. One advantage is that it permits drawing the air at a very quick rate through probe 30 thereby decreasing the time delay between the entry of the air in probe 30 until the air is at the sensor inlet with a minimum of effort from the fan 32. This is significant because the probe 30 may be quite long, for example, about 15 feet. Further, the amount of gas passing through filter 36 is reduced, prolonging filter life. At the same time, the volume flow of the gas across film 24 may be maintained at a sufficiently low level thereby minimizing the power requirements for heating the gas which flows across the sensor. Such heating is desired to provide optimum reaction with the palladium film 24. A second advantage of the bypass 31 is that it provides substantially cooler air in relatively large amounts to mix with the air coming from port 28a which has been heated. This cools the air from port 28a further minimizing an explosion hazard.

Electronic circuitry for maintaining the temperature of duct 26 at the desired level and for accurately measuring the resistance of film 24 is shown in section 40 and will be described in more detail.

Figure 2:
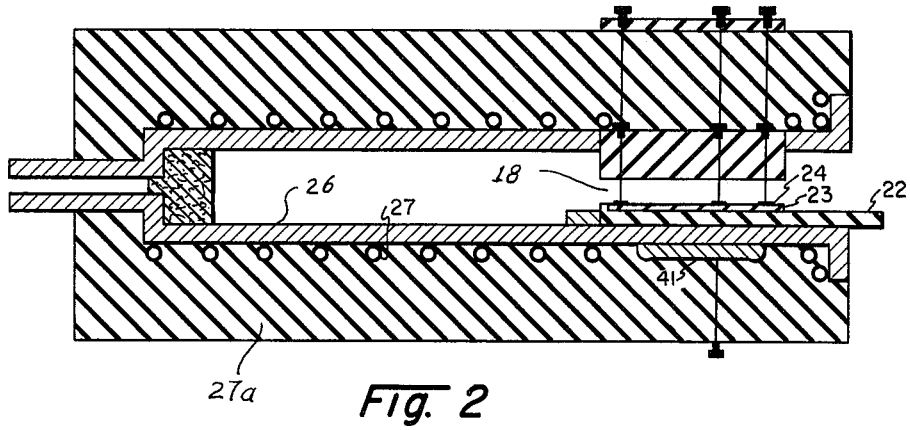
FIGURE 2 is an enlarged section of the film sensor portion of FIGURE 1 which enlarged portion is shown in an elevational section.

An insulative material 27a surrounds the heating coils 27 to conserve the heat produced thereby. The duct is made of silver thereby minimizing hot spots in contact with the sample air since silver has a very high conductance to heat and therefore would provide a minimum temperature differential across its surface. The chamber temperature is sensed by a thermistor 41, FIGURE 2, located just beneath the sensor plate 22. Due to the insulation and construction the total heater power required to maintain an 85° centigrade chamber temperature with air entering at a —20° centigrade at a rate of 100 cubic centimeters per minute is only six tenths watts with this design. This low power consumption is very important when such a unit is used in a satellite design.

*Temperature control unit*

The temperature control unit is used to maintain the sensing film and the sampled gas within the film chambers at the specified temperature and within the specified tolerance which tolerance is .1° centigrade in this embodiment.

The control uses a thermistor 41 (FIGURE 2) for the temperature sensing element. An amplifier is used to compare the thermistor resistance to a reference resistor set to maintain the required temperature. The error signal resulting is used to control the power through a heating coil or element surrounding the film chamber.

Air flow rate is reduced to 30 cubic centimeters per minute in order to (1) reduce the power requirements of the chamber heater and (2) to extend the life of the filter or desiccant material in the stream. The sensor film 24 is sensitive only to the concentration of the hydrogen in the sample atmosphere and not to the air flow rate. For example, actual flow tests were conducted over the flow range of one cubic centimeter per minute to 15,000 cubic centimeters per minute without incurring a reading error in excess of two tenths percent hydrogen.

The chemical filter material 36 employs a molecular sieve material that removes water vapor, methyl alcohol, nitrogen dioxide, UDMH and most other hydrocarbon type gases.

Figure 3:
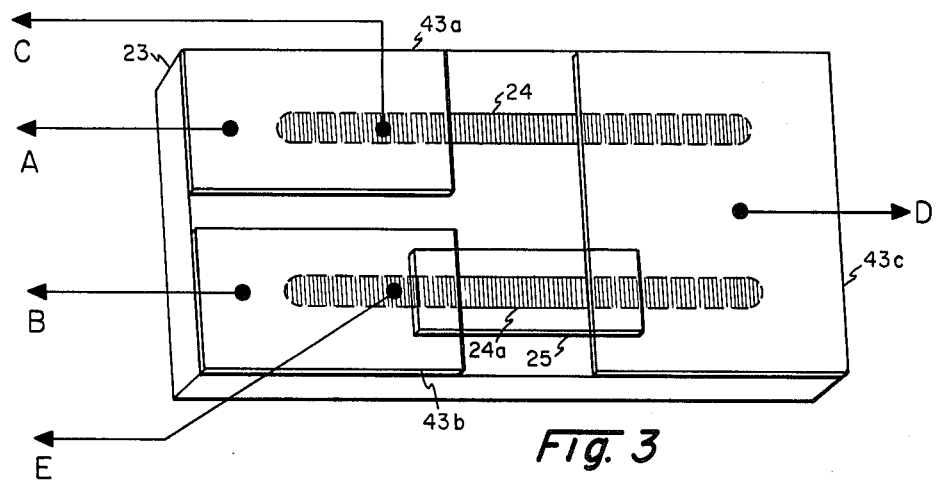
FIGURE 3 is a further enlarged perspective view of the sensing element of FIGURE 1.

In FIGURE 3 is shown an enlarged perspective plan view of the films, which in this embodiment have a glass substarte 23, and the palladium alloy sensing elements 24, 24a which are mounted on gold alloy tabs contacts 43a, 43b and 43c. A first palladium alloy 24 is attached to tabs 43a and 43c. A second palladium alloy sensing element 24a is completely masked from the incoming air by masking material 25 and is utilized in the temperature compensation circuit and attached to tabs 43b, 43c. The voltage connections A through E in FIGURE 3 are made to corresponding points A through E in FIGURE 4 which is the film sensor bridge 50 shown in FIGURE 5. This circuit minimizes the resistance formed by the contacts made by the leads A through E.

The circuit used in conjunction with these films (FIGURE 4) is so designed as to prevent arcing at the film leads, (1), by providing a voltage always below the ionization potential of normal air constituents and (2), by limiting current, even with bridge resistors shorted out, to very low values, far below that value causing vaporization of the films or tabs.

An amplitude stable A.C. voltage is applied at transformer 49 of the resistance bridge of the circuit in FIGURE 4. The presence of hydrogen gas in the sample incoming air causes the resistance of the sensing element to increase, thus unbalancing the bridge. The bridge output is amplified in a four-stage feedback amplifier 51 and then converted to a D.C. voltage by means of the synchronous demodulator 52 shown in FIGURE 5. This type of demodulator is insensitive to hum and noise voltages which might be picked up on the A.C. reference line or D.C. power line. In addition it is both linear and stable for input signals as low as one millivolt.

An alternate means of measuring film conductance is shown in FIGURE 8. This unit measures the change in film conductance from some predetermined initial value. The block diagram of FIGURE 8 shows a basic measurement technique. In FIGURE 8:

$A_1$, $A_2$=High gain operational amplifiers
S. G.=Reference voltage signal generator
$R_1$, $R_2$, and $R_3$=Fixed resistors
$R_S$=Resistance of sensing film (mounted in film chamber)
$R_B$=Resistance of reference film (mounted adjacent to sensing film). Included in $R_B$ is a trim resistor for fine balance.

$$\frac{e_o}{e_i} = \left[\frac{R_3}{R_B} - \frac{R_3}{R_S} \times \frac{R_2}{R_1}\right]$$

At balance, that is, with no output signal ($e_o=0$):

$$R_S = \frac{R_B R_2}{R_1}$$

The film conductance can be determined at balance if value of $R_B$, $R_2$ and $R_1$ are known. In practice, the ratio $R_1/R_2$ is set at 1, 10 or 100 so that the resistance $R_B$ is a convenient multiple of the film resistance.

The system sensitivity is:

$$\frac{de_o}{d\left(\frac{1}{R_S}\right)} = \frac{de_o}{dG_S} = e_i \frac{R_2 R_3}{R_1}$$

Sensitivity is easily changed by a change in $R_3$. In normal operation, $R_B$ is set at its desired value for balance. Then, all resistances are held constant except the sensor's film resistance. Thus:

$$e_o = \alpha \Delta G_S$$

i.e., output voltage is proportional to change in sensing film conductance.

The temperature control servo system is shown in boxes 55, 56 and 57 in the diagram of FIGURE 5.

The temperautre control servo system has the function of maintaining the film sensing element at a fixed operating temperature of 85° centigrade. The basic temperature sensor is a thermistor 41, FIGURE 2, fixed to the outer wall of the sensor chamber. It is compared to a fixed resistor in a bridge circuit 55 which is also operated from precision A.C. reference voltage. The bridge unbalance is amplified and used to control the width of a pulse generator 56. The variable width pulse is completed through a power amplifier 57 to a heater element 27 which is wrapped around the outside of the sensor chamber 18 (FIGURE 1). If the chamber is below its design temperature, the bridge signal will be in the direction to increase the drive pulse width and consequently the power applied to the heater. If the temperature is above its design level, the pulse width and heater power will be decreased.

In FIGURES 6a, 6b and 7 are shown various methods of fabrication of films for obtaining desired reactions. In FIGURE 6a is shown a glass substrate 23a having thereon a palladium film 24a on which is placed porous ceramic film 60 and over this is placed a second palladium film barrier 61. The palladium film barrier is not connected to the circuit but merely acts as a filter allowing only the hydrogen gas to pass therethrough. A second filter is the porous ceramic film 60, the pores of which are sufficiently small to prevent the larger molecule gases from passing so that essentially only the hydrogen gas reaches the palladium film 24a.

In FIGURE 6b only the porous ceramic film 60 is used to filter and the palladium film barrier 61 is removed.

The pores in film 60 are again sufficiently small that the larger molecule gases are prevented from reaching the film 24.

In FIGURE 7 the base is a porous insulator 23b and is of a porous surface and on this is deposited the palladium film 24b which of course will assume the general outline of the porous base 23b. The film 24b is that used in the electrical circuit of FIGURES 4 or 8 and is the film whose resistance change is measured to determine the hydrogen content. Due to the uneven surface, more surface area is exposed to the hydrogen gas passing thereover and strains are set up along the surface making the surface more reactive, hence, providing faster reactions between the hydrogen gas passing thereover and film.

Metals other than palladium may be used as the sensing film such as titanium, vanadium, zirconium, etc. or of alloys such as silver or boron palladium alloy, titanium tantalum alloy films instead of the palladium film.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A sensor for measuring an elemental content such as hydrogen in a gaseous medium comprising
   a sensing chamber having film means therein,
   an exhaust chamber physically separate and distinct from said sensing chamber,
   said film means being of a material that reacts with the elemental content in the gaseous medium to be sensed thereby changing the resistance of the film,
   resistance measuring means for measuring the change in resistance of the film,
   probe means for receiving a sample of gaseous medium,
   a sensing chamber passage connected to said probe means for conducting a portion of a sample of gaseous medium to said sensing chamber,
   exhaust means connected to said sensing chamber for conducting sensed gas to said exhaust chamber,
   bypass means connected to said probe means for conducting the remainder of said gaseous sample directly from said probe means to said exhaust chamber thus bypassing said sensing chamber,
   heating means located to heat only said portion of a sample of gaseous medium conducted to said sensing chamber to a predetermined temperature whereby the remainder of said sample is unheated,
   said heated portion after passing through said sensing chamber being conducted to said exhaust chamber thereby minimizing explosion hazards, and
   means to cause the gaseous medium to flow through said probe means, sensing chamber and bypass means.

2. The sensor of claim 1 having filter means to filter only said portion of a sample of the gaseous medium going to said sensing chamber whereby the remainder of the sample of said gaseous medium is unfiltered.

References Cited by the Examiner

UNITED STATES PATENTS

| | | | |
|---|---|---|---|
| 1,174,631 | 3/1916 | Snelling | 73—23 |
| 1,559,461 | 10/1925 | Ruben | 73—26 |
| 2,080,953 | 5/1937 | Rensch | 73—27 |
| 2,811,037 | 10/1957 | Beard | 73—23 |
| 2,920,478 | 1/1960 | Golay | 73—23.1 |
| 2,999,379 | 9/1961 | Beard et al. | 73—23 |
| 3,174,325 | 3/1965 | Redhead | 73—23 |

RICHARD C. QUEISSER, *Primary Examiner.*

J. FISHER, *Examiner.*